United States Patent [19]

Ogren

[11] Patent Number: 4,802,498

[45] Date of Patent: Feb. 7, 1989

[54] RESIN-BASED CHEWING TOBACCO

[76] Inventor: Warren Ogren, Rte. 8, Ogren Rd., Hayward, Wis. 54843

[21] Appl. No.: 69,700

[22] Filed: Jul. 2, 1987

[51] Int. Cl.$^4$ ............................................. A24B 15/18
[52] U.S. Cl. ...................................... 131/359; 131/369
[58] Field of Search ............... 131/270, 352, 354, 369, 131/355

[56] References Cited

U.S. PATENT DOCUMENTS

| | | | |
|---|---|---|---|
| 214,639 | 4/1879 | Emery | 131/352 |
| 327,158 | 9/1885 | Gloeser | 131/352 |
| 1,407,274 | 2/1922 | Hibbert | 131/352 |
| 2,708,175 | 2/1958 | Samfield | 131/352 |
| 3,369,551 | 2/1968 | Carroll | 131/359 |

*Primary Examiner*—V. Millin
*Attorney, Agent, or Firm*—Palmatier & Sjoquist

[57] ABSTRACT

A tobacco containing gum which is chewable and includes propolis as a breath freshener to decrease the throat irritation or stomach upset which commonly occurs with tobacco containing products. The tobacco containing gum being part of an overall program to decrease the user's dependence on tobacco.

8 Claims, No Drawings

RESIN-BASED CHEWING TOBACCO

BACKGROUND OF THE INVENTION

The present invention relates to tobacco-containing gums, more particularly to a tobacco-containing gum product for use in breaking the tobacco habit by gradually decreasing the amount of tobacco present in the chewing gum. The present invention also includes a breath freshener to eliminate the odors inherent in tobacco containing products.

U.S. Pat. No. 904,521, issued to Ellis on Nov. 24, 1908, discloses a tobacco-based gum containing snuff and tobacco extract in a wax base. This patent also discloses the process of decreasing the tobacco content in the product in an effort to eliminate the person's dependence on tobacco. Additionally, U.S. Pat. No. 865,026, issued to Ellis on Sept. 3, 1907, discloses the process for manufacturing a tobacco-containing product similar to the product disclosed in the later issued Ellis patent, U.S. Pat. No. 904,521.

Various types of gum bases have also been disclosed in prior patents. One such gum base is described in U.S. Pat. No. 4,317,837 issued to Kehoe, et al. on Mar. 2, 1982. The Kehoe Patent is directed to a chewable gum base having at least 10 percent air voids entrapped in the gum base matrix. Table 2 of the Kehoe Patent lists the common ingredients in a conventional gum base. Another example of a conventional gum base is disclosed in U.S. Pat. No. 3,352,689 issued to Bilotti on Nov. 14, 1967 and is described at column 3, lines 4–13.

Other prior patents, such as U.S. Pat. No. 3,845,217, issued to Ferno, et al. on Oct. 29, 1974, are directed to the common problem of mouth or stomach irritation caused by nicotine-containing products. The Ferno Patent addresses this problem by the addition of a water soluble buffering agent to the nicotine product. The buffering agent increases the pH of the saliva above its normal physiological pH and therefore provides a nicotine-containing product having fewer complaints of irritation.

SUMMARY OF THE INVENTION

The object of this invention is to provide a tobacco-containing product which incorporates a breath freshener as one of its primary ingredients.

Another object of the present invention is to provide a tobacco-containing product which incorporates decreasing amounts of tobacco or tobacco extracts to enable the user to decrease their dependency on tobacco products.

A further object of the present invention is to provide a tobacco-containing product which does not irritate the mouth or stomach lining of the user.

Generally described, the present invention is a tobacco containing chewing gum having a conventional gum base, tobacco and propolis as its primary ingredients. Additionally, various sweeteners, lubricants, plasticizers and fillers are added to provide a final product which is chewable and causes relatively little stomach upset.

An advantage of the present invention is that it provides a versatile tobacco-containing product which aids in reducing the user's dependence on tobacco.

Another advantage of the present invention is that it incorporates a breath freshener having a mildly anesthetic property to decrease the irritation commonly found with currently available tobacco-containing products.

DESCRIPTION OF THE PREFERRED EMBODIMENT

In accordance with the present invention, the tobacco containing gum includes a conventional gum base which is commercially available and preferably includes masticatory ingredients of natural origin such as candelilla or paraffin wax. The gum base comprises about 20–40 parts by weight of the final product and may be incorporated into sugared or sugarless versions of the invention.

To form the present invention, the gum base is gradually melted and a softener such as lecithin is added to the melted gum base until a final concentration of about 0.1 in 3 parts by weight is reached. Examples of other softeners which may be used are cephalin, Tweens, Spans, or glyceryl monostearate. Next, a filler/texturizer, such as calcium carbonate, is added to this mixture in a concentration of about 0.1 to 5 parts by weight. Other free filler/texturizers such as alumina, talc or aluminum hydroxide may be substituted for the calcium carbonate. Finally, a hydrophilic plasticizer such as glycerine is added in a concentration of up to 6 parts by weight. Examples of other hydrophilic plasticizers which may be utilized are beeswax, methyl cellulose, or propylene glycol.

To this mixture, a sweetener, such as hydrogenated glucose syrup, is added in a concentration of about 5 to 25 parts by weight. Sorbitol is then added in a concentration of about 40 to 70 parts by weight to serve as both a sweetener and a filler. Pulverized tobacco is then added to a final concentration of up to 20 parts by weight. Finally, various natural flavorings, such as peppermint oil or spearmint oil, are added in a concentration of about 0.1 to 3 parts by weight. Next, propolis tincture is added to a final concentration of about 0.1 to 5 parts by weight. The addition of the natural flavoring and propolis causes the mixture to gel into a cohesive mass that may be removed from the mixing container and formed into the desired final form, such as sticks, tablets or the like. Additionally, if a tablet shaped product is desired, a sweetener such as sorbitol syrup may be applied to the outer surface of the tablet to provide a coated piece of chewing gum.

The following table lists the preferred ingredients and concentrations of my invention:

TABLE 1

| Ingredient | Parts by Weight | Preferred Weight |
|---|---|---|
| Gum Base | 20–40 | 25–30 |
| Hydrogenated Glucose Syrup | 5–25 | 8–14 |
| Lecithin | 0–3 | 0.2–1 |
| Calcium Carbonate | 0.1–5 | 1–3 |
| Sorbitol | 40–70 | 50–60 |
| Glycerine | 0–6 | 0.5–1 |
| Natural Flavoring | 0.1–3 | 1–1.5 |
| Propolis | 0.1–5 | 1–3 |
| Pulverized Tobacco | 0–20 | 2–10 |

One of the features of this invention is to provide a tobacco containing product which includes decreasing amounts of tobacco or nicotine in the conventional gum base. Therefore, it is anticipated that the final commerical product will have various concentrations of tobacco in decreasing amounts, such as 15, 10, 5 and 2 parts by weight of tobacco, to enable the user to gradually decrease their dependence on the tobacco.

The sugarless version of my invention consists of the following preferred ingredients and concentrations:

TABLE 2

| Ingredient | Concentration by Weight |
|---|---|
| Sorbitol | 50.2% |
| Gum Base | 27.4% |
| Lycosin | 15.0% |
| Pulverized Tobacco | 0.1-8.0% |
| Propolis | 1-5.0% |
| Lecithin | 1.0% |
| Glycerine | .7% |
| Natural Flavoring | .7% |

The sugarless version of my invention replaces hydrogenated glucose syrup with hydrogenated starch hydrosylate (lycosin) as the sweetener. Additionally, a coloring compound may be added to either form of the invention to provide the final product with a brown tobacco like appearance.

Although the resinous form of propolis may be used in either of the above versions of my invention, it has been found that propolis tincture provides a final product with a more consistent appearance and texture. Additionally, the use of propolis tincture enables the propolis to be more evenly distributed throughout the gum and therefore more consistently decreases the amount of stomach upset due to the presence of tobacco in the product.

What is claimed:

1. A tobacco containing gum comprising
   (a) a gum base, in a concentration of 20 to 40 parts by weight,
   (b) a sweetener, in a concentration of 5 to 25 parts by weight,
   (c) a softener, in a concentration of 0.1 to 3 parts by weight,
   (d) a filler, in a concentration of 0.1 to 5 parts by weight,
   (e) sorbitol in a concentration of 40 to 70 parts by weight,
   (f) tobacco, in a concentration of 0.1 to 20 parts by weight,
   (g) propolis, in a concentration of 0.1 to 5 parts by weight, and
   (h) a natural flavoring, in a concentration of 0.1 to 3 parts by weight.

2. The tobacco containing gum of claim 1, wherein the propolis is a tincture and in the concentration of 1 to 3 parts by weight.

3. The tobacco containing gum of claim 2, wherein the tobacco is pulverized and added to the tobacco containing gum in decreasing concentrations to a final concentration of 0.1 parts by weight.

4. The tobacco containing gum of claim 1, wherein calcium carbonate is the filler.

5. The tobacco containing gum of claim 1, wherein glycerine is the softener.

6. The tobacco containing gum of claim 1, wherein hydrogenated glucose syrup is the sweetener.

7. A sugarless form of the tobacco containing gum of claim 1, wherein lycosin in a concentration of 10 to 20 parts by weight is added as the sweetener.

8. A tobacco containing gum comprising
   (a) a conventional gum base, in a concentration of 20 to 40 parts by weight,
   (b) hydrogenated glucose syrup, in a concentration of 5 to 25 parts by weight,
   (c) glycerine, in a concentration of 0.1 to 3 parts by weight,
   (d) calcium carbonate, in a concentration of 0.1 to 5 parts by weight,
   (e) sorbitol, in a concentration of 40 to 70 parts by weight,
   (f) tobacco, in a concentration of 0.1 to 20 parts by weight,
   (g) propolis, in a concentration of 0.1 to 5 parts by weight.

* * * * *